L. O. ERICKSON.
MEASURING INSTRUMENT.
APPLICATION FILED NOV. 17, 1915.
1,224,725.
Patented May 1, 1917.
2 SHEETS—SHEET 2.
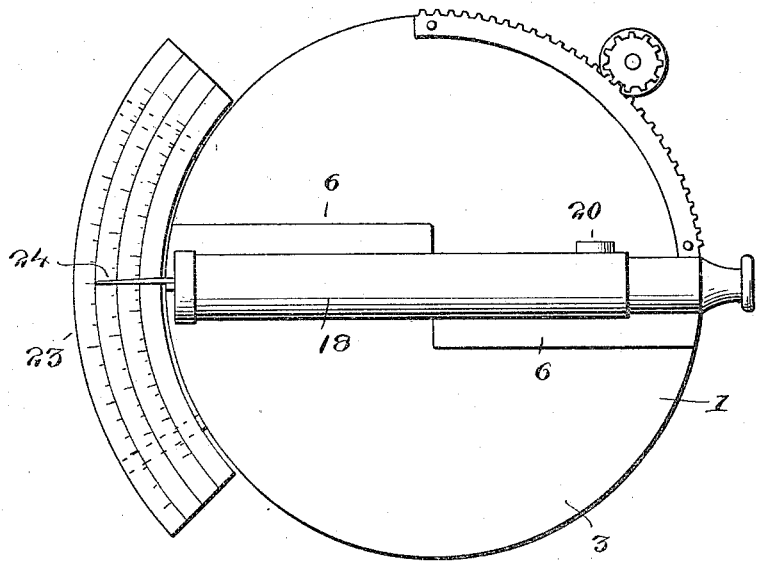
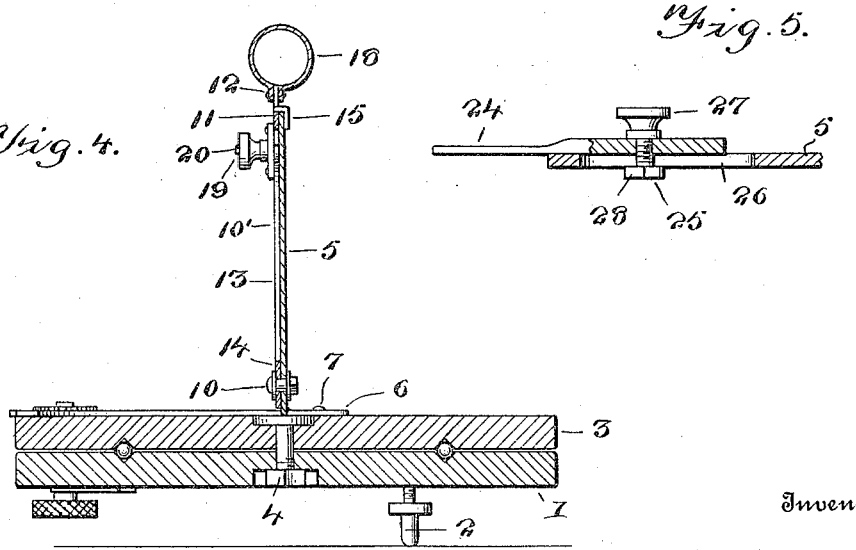
Witnesses
E. R. Ruppert.
C. C. Hines.
Inventor
Louis O. Erickson
By Victor J. Evans
Attorney

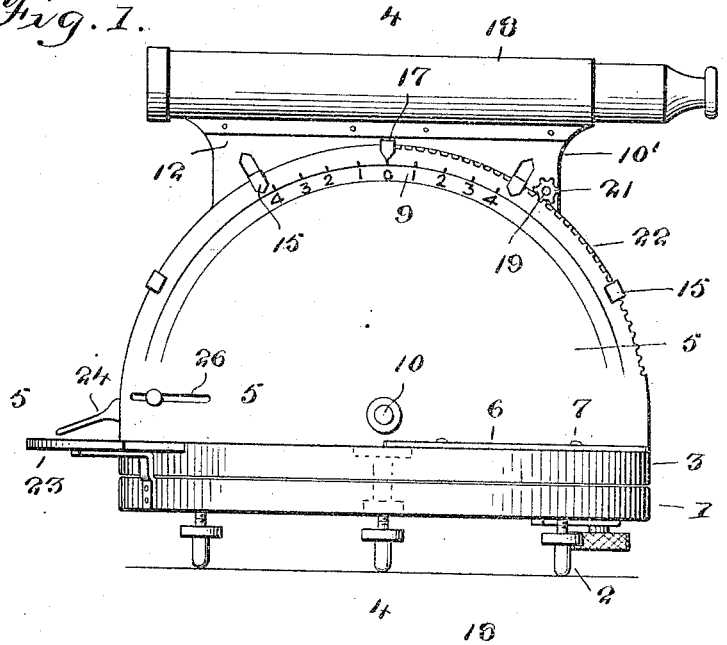
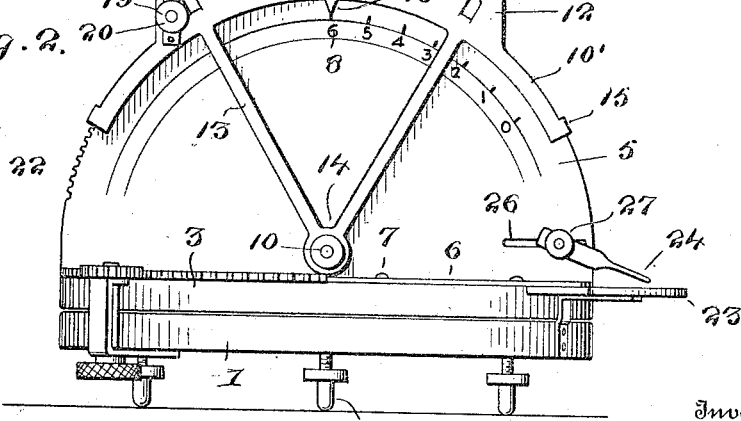

UNITED STATES PATENT OFFICE.

LOUIS O. ERICKSON, OF DENVER, COLORADO.

MEASURING INSTRUMENT.

1,224,725.   Specification of Letters Patent.   Patented May 1, 1917.

Application filed November 17, 1915. Serial No. 61,985.

*To all whom it may concern:*

Be it known that I, LOUIS O. ERICKSON, a citizen of the United States, residing at Denver, in the county of Denver and State of Colorado, have invented new and useful Improvements in Measuring Instruments, of which the following is a specification.

This invention relates to measuring instruments, and one of its objects is to provide a simple, convenient, comparatively inexpensive, reliable and efficient construction of instrument which is adapted for use in measuring distances, altitudes, heights and depths, and also for measuring distances in a horizontal plane between objects on opposite sides of a given point, or for measuring one of the sides of a triangle the measurement of the other sides of which are known.

A further object of the invention is to provide an instrument of the character described which is also particularly well adapted for range finding and for determining the speed of travel of a moving object, such as a ship, with reference to determined points.

The invention consists of the features of construction, combination and arrangement of parts herein fully described and claimed, reference being had to the accompanying drawings in which:—

Figure 1 is a view in side elevation of a measuring instrument embodying my invention.

Fig. 2 is an opposite side elevation of the same.

Fig. 3 is a top plan view.

Fig. 4 is a vertical transverse section on the line 4—4 of Fig. 1.

Fig. 5 is a sectional view on the line 5—5 of Fig. 1.

In carrying my invention into practice, I provide a suitable base support 1, preferably of circular form, and provided with adjustable knobs or feet 2, whereby the base may be leveled in a ready and convenient manner. Mounted upon this base is a rotary disk or turn table 3, which is adapted to turn or rotate upon a connecting bolt or axis 4, said disk or turn table forming a support for the working parts of the apparatus and being arranged and movable in a horizontal plane. Anti-friction bearings of any preferred type may be provided between the base and turn table, if desired.

Mounted on the turn table is a vertically disposed plate 5, of semi-circular form, the straight edge of which is disposed to rest upon the surface of the turn table and is provided on opposite sides of its transverse center with laterally projecting flanges 6 through which pass suitable fastenings 7 which enter the turn table and fasten the segmental plate thereto in a firm and durable manner.

The plate 5 is provided upon its opposite sides with graduated scales 8 and 9, extending on arcs of circles concentric with a pivot pin or bolt 10. As shown, the scale 8 is provided with two sets of scale graduations, beginning with a zero designation and increasing numerically in value in opposite directions from the zero point adjacent to the central and highest sets of scale graduations and are respectively adapted for use in the forward and downward and upward and rearward movements of the sight tube or telescope, hereinafter described, for predetermining elevations in feet or otherwise between the level at which the instrument is arranged and higher and lower levels. The scale 9, on the other hand, is provided with scale graduations extending forwardly from a point in line with the zero graduation of the scale 8 and decreasing numerically in value to a forward or zero point, said scale being adapted for coöperation with the sight tube or telescope mentioned for determining the depth and thickness of objects and linear distances of objects from the point of location of the instrument. For coöperation with these scales a movable V-shaped bracket support 10' is provided, which includes a segmental guide strip 11 provided with a head plate or portion 12, converging arms 13, and an eye 14 connecting said arms at the vertex and engaging the pivot pin or bolt 10. The strip 11 is arranged to engage one side of the plate 5 adjacent to the periphery thereof and has guide members 15 projecting therefrom and overlapping the opposite side of the plate 5, whereby said bracket member is held in guided relation to the segmental edge of the plate.

The bracket member is provided on opposite sides with pointers 16 and 17 for coöperation with the respective scales, whereby the degree of adjustment of the swinging bracket may be determined, and supported upon the head plate 14 is a sight tube 18, preferably in the form of a telescope, whereby the object whose distance from the instrument is to be measured may be sighted, which telescope in practice has a determined focal range of observation. Supported upon the head plate is a transverse shaft or axle 19 provided with an operating knob or finger piece 20 and the gear pinion 21, which pinion 21 meshes with a segmental series of rack teeth 22 upon the edge of the plate 5, whereby the swinging bracket and sight member may be adjusted in a ready and convenient manner and retained in adjusted position.

It will be understood of course, that the scales upon the opposite sides of the indicator plate 5 being properly calculated, the distance of any given object from the point of observation may be readily and conveniently determined, as well as the elevation, depth or thickness of an object, and that the device provides an efficient type of instrument for range finding use on land or shipboard, by means of which the distance of any object from a fort or ship may be quickly and conveniently determined with accuracy.

Carried by the support 1 is a scale plate or segment 23 extending concentric with the axis of rotation thereof, and provided with a series of circumferential subdivisions, each graduated and forming a series of scales, said divisions being arranged on concentric arcs of different radii and at different distances from the center of rotation of the turn table 3. Mounted for coöperation upon the plate 5 with said scale plate 23 is an adjustable pointer 24, through which pointer projects a screw 25 which also passes through a guide slot 26 in the plate, and is provided at one end with an adjusting knob 27 and at its opposite end with a retaining nut 28, by means of which the pointer may be adjusted in and out for coöperation with any of the aforesaid scales of the scale plate 23 and secured in adjusted position. Each of the arcuate scale divisions of the scale plate 23 may be provided with radial subdivisions, and when the instrument is at zero or a neutral point the pointer may extend in line with the central radial division of the outer scale of the scale plate. When it is desired to ascertain the distance between any two points horizontally within the range of the instrument, and which are equidistant from an intermediate point, the pointer is brought to register with an intermediate point of the scale and the distance intermediate point at which the telescope is sighted to determine the distance of such point from the instrument, after which the instrument is turned laterally in opposite directions beyond the intermediate point and sight observations respectively taken through the telescope to determine the distances of such opposite points from the instrument. These distances being known or calculated the distance between the points on opposite sides of the central or intermediate point may thereupon be readily determined or ascertained by reference to the scale. In this manner the length of one side of a triangle, the length of whose other sides are known, may be readily and conveniently determined. Also by this method of calculation the distance of a moving object, such as a ship, from the instrument may be determined, and its time period of travel between horizontal points estimated, so that its speed of travel may be ascertained for ordnance sighting or other purposes.

It will be apparent from the foregoing description that the invention provides an instrument which is of maximum simplicity of construction, and which is at the same time of an easily operated type, and sufficiently accurate and efficient for all ordinary purposes, and which may be manufactured and sold at a comparatively low cost.

I claim:—

1. A measuring instrument comprising a base, a rotary member mounted upon the base, a segmental scale plate on the base having concentric and radial subdivisions, an upright partly circular scale plate carried by said rotary member, a swinging indicator movable in an arc coincident with the curved edge of said upright scale plate, a sight member carried by said indicator, and a pointer carried by the upright scale plate for coöperation with the scale plate upon the base.

2. A measuring instrument comprising a base, a rotary member mounted upon the base, a segmental scale plate on the base having concentric and radial subdivisions, an upright partly circular scale plate carried by said rotary member, a swinging indicator in guided connection with the curved edge of said upright scale plate, gearing for swinging said indicator, a sight member carried by said indicator, and a pointer carried by the upright scale plate for coöperation with the scale plate upon the base.

In testimony whereof I affix my signature in presence of two witnesses.

LOUIS O. ERICKSON.

Witnesses:
MARY R. SANDALL,
ELBA J. CAMPEN.